United States Patent
Okada

[15] 3,651,744
[45] Mar. 28, 1972

[54] PHOTOGRAPHIC CAMERA

[72] Inventor: Takaaki Okada, Ageo-shi, Japan

[73] Assignee: Kabushiki Kaisha Koparu

[22] Filed: Dec. 29, 1969

[21] Appl. No.: 888,515

[30] Foreign Application Priority Data

Jan. 13, 1969 Japan......................44/2543

[52] U.S. Cl. ..................95/10 CT, 95/53 EB, 250/215, 356/226
[51] Int. Cl. ..................G03b 7/08, G03b 17/18, G01j 1/46
[58] Field of Search..............95/10 C, 53 E, 53 EB; 250/206, 250/215; 356/218, 226

[56] References Cited

UNITED STATES PATENTS

| | | |
|---|---|---|
| 3,348,462 | 10/1967 | Fahlenberg...............95/53 |
| 3,397,629 | 8/1968 | Mori et al...............95/10 C |
| 3,504,601 | 4/1970 | Schubert...............95/10 C X |

FOREIGN PATENTS OR APPLICATIONS 1,544,737  9/1968  France...............95/10 C

Primary Examiner—Joseph F. Peters, Jr.
Attorney—Otto John Munz

[57] ABSTRACT

When indication of exposure time is required, an oscillation circuit means housed in the photographic camera is actuated. The signal waves generated consecutively from said circuit means are of the frequencies and waveforms corresponding to the different brightnesses of the object to be photographed. The values associated with said frequencies and waveforms are determined by a measuring means including an indicator. Then, this indicator permits the exposure time to be expressed.

17 Claims, 20 Drawing Figures

PRIOR ART $$V_{cx} = E(1 - e^{-\frac{t}{C_x R_x}})$$

EXPOSURE TIME (T)
SW1 : ON
Tr1, Tr2, Tr3 : ON
Tr4 : OFF

COLLECTOR CURRENT OF Tr4

EXPOSURE TIME (T)
SW1 : ON    Tr4 : OFF

INVENTOR
TAKAAKI OKADA

BY
ATTORNEY

INVENTOR
TAKAAKI OKADA

BY
ATTORNEY

INVENTOR
TAKAAKI OKADA
BY
ATTORNEY

PHOTOGRAPHIC CAMERA

BACKGROUND OF THE INVENTION

1. Field of the Invention

The present invention is concerned with a photographic camera, and more particularly, it is related to a photographic camera equipped with an electronic shutter device capable of automatically determining the exposure time and provided with means for indicating the exposure time prior to taking a photograph.

2. Description of the Prior Art

In general, an electronic shutter device employed in a photographic camera is provided with a delay circuit or a timing circuit comprising a series circuit consisting of a photosensitive element and a capacitor. When a photographer desires to know beforehand the exposure time necessary for taking a photograph, he performs the switching over, by the manipulation of a switch means, of the connection between the photosensitive element and the capacitor to the connection between said photosensitive element and an ammeter. Whereupon, the value of resistance of the photosensitive element which varies in accordance with the difference in the brightness of the scene is measured by the ammeter to indicate the exposure time. Such a technique of measurement of the resistance value is known, and this is a technique which has been widely employed for the indication of the exposure time.

However, in such a conventional technique for indicating the exposure time by directly measuring the resistance value of the photosensitive element, the positions in which various factors for the photography such as the sensitivity of the film used and the diameter of the diaphragm to be opened are set in the electronic shutter circuit are subjected to certain limitations. This is because of the fact that the setting of these factors in the electronic shutter circuit has to be performed solely by the diaphragm mechanism which is adapted to alter the light-receiving area of the photosensitive element, and not by the change in the biasing point of the transistor employed in the electronic circuit. This diaphragm mechanism employed in the prior art is a complicated one and also is large in size. For the foregoing reasons, it is not desirable to perform the indication of the exposure time by direct measurement of the resistance value of the photosensitive element.

SUMMARY OF THE INVENTION

It is, therefore, a primary object of the present invention to provide a photographic camera equipped with a device capable of preliminarily indicating the exposure time determined automatically by an electronic shutter, without directly measuring the resistance value of the photosensitive element.

Another object of the present invention is to provide a photographic camera equipped with an oscillation circuit which is necessary for determining the exposure time and which is capable of generating signals having cycles or frequencies corresponding to the difference in the brightness of the object to be photographed.

Still another object of the present invention is to provide a photographic camera equipped with an electronic shutter device having a simplified arrangement of electronic circuit which is suitable for oscillating consecutive signals.

Yet another object of the present invention is to provide a photographic camera equipped with a waveform converter circuit which is capable of converting the waveform of the signals so as to be handled easily by the measuring means.

A further object of the present invention is to provide a photographic camera equipped with a measuring means including an indicator, said measuring means being assigned to handle the consecutively supplied signal waves which have been already converted.

A better understanding of the present invention will be obtained by reading the following description when taken in conjunction with the accompanying drawings.

DESCRIPTION OF THE PREFERRED EMBODIMENTS

Figure 1:
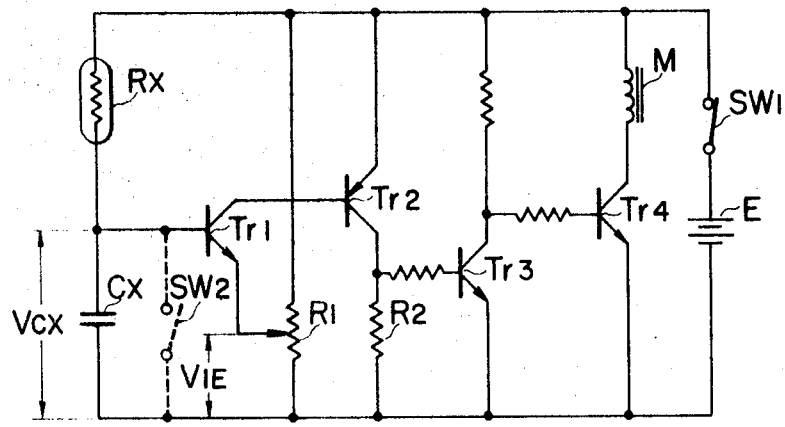
FIG. 1 is a diagrammatic representation of an electronic shutter device of the prior art.

By referring to FIG. 1 which shows a known electronic shutter means, the basic behavior of this circuit may be described. In this circuit, a network including a photosensitive element $Rx$ and a capacitor $Cx$ is a delay circuit. A network including a transistor $Tr_1$ is an amplitude selection circuit, and a network including transistors $Tr_2$ through $Tr_4$ is a switching circuit. In this example, the photosensitive element $Rx$, which is adapted to be exposed to the light coming from the object to be photographed, is connected in series with the capacitor $Cx$. Upon the closure of a power switch $SW_1$, the current which flows through the photosensitive element $Rx$ from the power source E begins to charge the capacitor $Cx$. Whereupon, the instantaneous voltage $Vcx$ across the capacitor $Cx$ will rise exponentially toward the voltage of power source E. After a certain length of time has elapsed following the closure of the switch $SW_1$, the aforesaid voltage $Vcx$ will gain a level higher than the emitter voltage $V_{IE}$ of the transistor $Tr_1$ which has been preliminarily determined by a potentiometer $R_1$, resulting in the "on" state of the transistor $Tr_1$. This "on" state of the transistor $Tr_1$ will cause the "on" state of the transistor $Tr_2$, causing a voltage to appear at the terminal of the resistor $R_2$. When this voltage has brought the transistor $Tr_3$ into the "on" state, the potential of the collector of the transistor $Tr_3$ will drop below the level held up to that moment. Therefore, the state of the transistor $Tr_4$ is converted from the "on" state to the "cutoff" state. As a result, the electromagnet M for controlling the shutter blades (not shown) which is connected to the collector of the transistor $Tr_4$ will cease its action. The shutter blades which have been retained in their open state by the electromagnet M until the transistor $Tr_4$ was cut off will close upon this "cutoff" of the transistor $Tr_4$. The aforesaid certain length of time, i.e., the length of time till the terminal voltage of the capacitor $Cx$ gains a predetermined level of voltage $V_{IE}$, is the period in which the shutter blades are held open. This length of time signifies the exposure time T. Although this time is of a value slightly different from the actual exposure time owing to the mechanical delay of the shutter mechanism, it is reasonable to assume that these lengths of time are substantially identical for the simplicity of explanation. The switch $SW_2$, which is indicated by dotted lines, represents essentially a switch for lowering the initial voltage of the capacitor $Cx$ to zero. By arranging this switch $SW_2$ so that it will open after the power switch $SW_1$ closes, it can be used also as a switch for starting the charging of the capacitor.

Figure 2A:
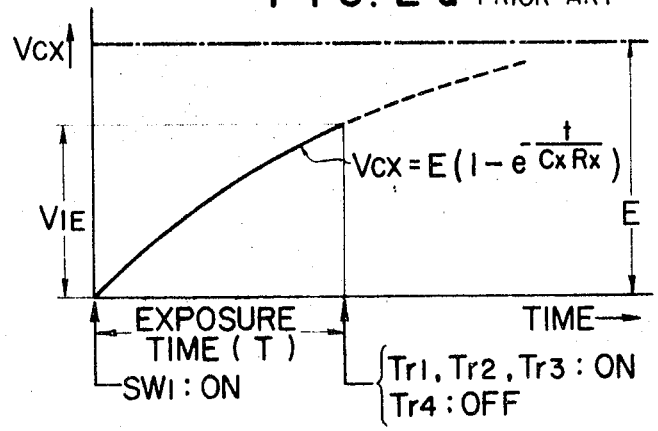
FIG. 2a and FIG. 2b are graphs showing the terminal voltage of the capacitor and the collector current of the output transistor, respectively, in relation with time, of the circuit shown in FIG. 1.
Figure 2B:
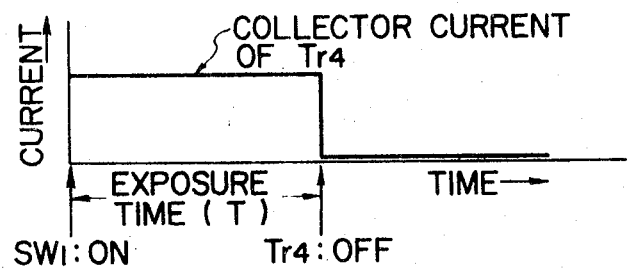

In FIG. 1, which shows a known exposure time control circuit, the functions of the transistors $Tr_1$ through $Tr_4$ are limited to only convert one state to another at the point at which the terminal voltage $Vcx$ of the capacitor exceeds the predetermined value $V_{IE}$. In other words, such a conventional exposure time control circuit means a circuit for generating a single pulse. This will be understood more clearly by referring to FIG. 2a and FIG. 2b. In FIG. 2a, the terminal voltage of the capacitor $Cx$ is shown in relation with time. In FIG. 2b, the collector current of the transistor $Tr_4$ which flows through the electromagnet M is shown in simplified waveform in relation with time.

Accordingly, if a discharge circuit means is additionally provided to repeatedly discharge the capacitor $Cx$ when the terminal voltage $Vcx$ has reached the aforesaid predetermined value $V_{IE}$, then the exposure time control circuit will make it possible to generate consecutive signal waves. These signal waves will naturally have the frequencies consisting of a cycle represented by the time T, or in other words, the signal waves will have frequencies corresponding to the difference in brightness of the object to be photographed. Description will be made, by referring to FIG. 3 through FIG. 11, of the device for preliminarily indicating the exposure time, utilizing the exposure time control circuit shown in FIG. 1. Also, an improved novel exposure time control circuit or an electronic shutter circuit which is suitable for generating consecutive signals is described by referring to FIG. 12. It will be understood from the statement hereunder given that the electronic shutter circuit shown in FIG. 12 can be substituted for a portion of each of the circuits shown in FIGS. 3, 6, 7 and 9. For the simplicity of explanation, it should be understood that like parts having similar functions throughout the drawings are indicated by like reference numerals except in those instances where there is necessity for special explanation to differentiate the function from that of other similar parts. Overlapping of explanation is omitted unless particularly necessary.

Figure 3:
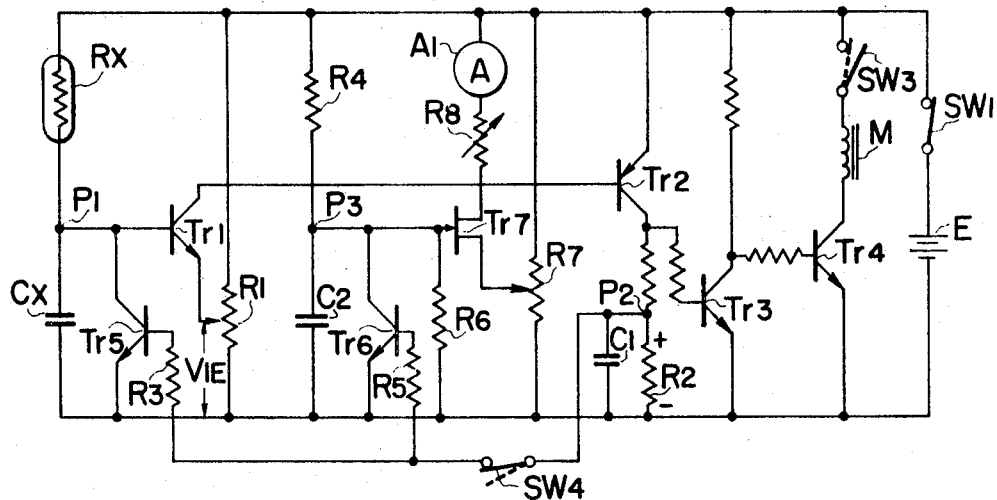
FIG. 3 is an electronic circuit showing one embodiment of the present invention.

In FIG. 3 which shows the present invention, when the switch $SW_3$ is closed (indicated by dotted lines) and when the switch $SW_4$ is open (indicated by dotted lines), the circuit consisting of the transistors $Tr_1$ through $Tr_4$ is capable of controlling the exposure time in the same way as does the circuit shown in FIG. 1, and it is possible to use this circuit for the electronic shutter. Accordingly, its explanation is omitted here. When, however, it is required to indicate the exposure time, the switch $SW_3$ is opened as shown in solid line. Also, the switch $SW_4$ is closed as illustrated in solid line. If, at such a stage, the power switch $SW_1$ is closed, the terminal voltage $Vcx$ of the capacitor $Cx$ will rise toward the terminal voltage of the power source E by virtue of the current flowing through the photosensitive element $Rx$. When the voltage $V_{P1}$ at the point $P_1$ of contact between the photosensitive element and the capacitor $Cx$, or in other words, the voltage $Vcx$, increases higher than the voltage $V_{IE}$ preliminarily determined by the potentiometer $R_1$ after the lapse of the exposure time T, the transistors $Tr_1$ and $Tr_2$ will be brought into the "on" state. As a result, a voltage having the polarity as illustrated will be generated at the terminal of the resistor $R_2$ which is connected to the collector of the transistor $Tr_2$. Since this voltage generated at one terminal $P_2$ of the resistor $R_2$ is applied to the base electrode of the transistor $Tr_5$ via the switch $SW_4$ and a resistor $R_3$, the transistor $Tr_5$ will be brought into the "on" state, resulting in the resistance between the collector and the emitter electrode of this transistor $Tr_5$ taking a very low value. Because of this, the capacitor, which has been already charged by that time, will be discharged instantaneously, making the terminal voltage of the capacitor $Cx$ drop to a level equal to zero. At this moment, the voltage $Vcx$ at the point $P_1$, which indicates the base voltage of the transistor $Tr_1$, will have the relation of $Vcx < V_{IE}$ relative to the emitter bias voltage $V_{IE}$. This means that the transistor $Tr_1$ is cut off. This "cutoff" state of the transistor $Tr_1$ will be retained for the period until the terminal voltage $Vcx$ of the capacitor $Cx$ resumes the relation of $Vcx = V_{IE}$ owing to the charging of the capacitor $Cx$, or in other words, said state will last for the period of lapse of the exposure time T. However, the transistors $Tr_1$ and $Tr_2$ will be brought into the "on" state again when there is attained the relation of $Vcx = V_{IE}$. Accordingly, the voltage having the same polarity as the one described above will appear again at the terminal of the resistor $R_2$, causing the transistor $Tr_5$ to be brought into the "on" state again. The foregoing cycle of operation of the circuit is repeated, and therefore, the network including the transistors $Tr_1$, $Tr_2$ and $Tr_5$ will provide an oscillation circuit arrangement. In FIG. 3, there is shown a feedback network extending from one terminal $P_2$ of the resistor $R_2$ of the collector of the transistor $Tr_2$ to the base of the transistor $Tr_5$. It should be understood that the feedback from a portion of the circuit other than the point $P_2$ to the base of the transistor $Tr_5$ is possible also. In this arrangement, $C_1$ represents a capacitor having a small capacitance which is used to slightly broaden the breadth of the pulse wave which is generated at the terminal of the resistor $R_2$ and this capacitor $C_1$ is a part which is not always necessary. Also, the switch $SW_2$ shown in dotted lines in FIG. 1 is always held open when it is intended to indicate the exposure time. For simplicity of explanation, therefore, this switch $SW_2$ is omitted from this circuit.

Figure 4A:
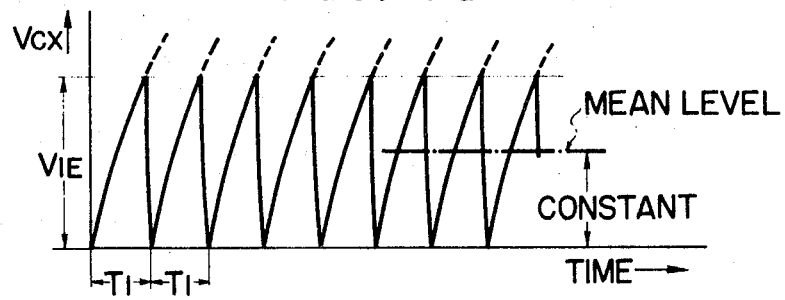
FIG. 4a and FIG. 4b are graphs showing the terminal voltage of the capacitor of the timing circuit for two different brightnesses of the scene in relation with time.
Figure 4B:
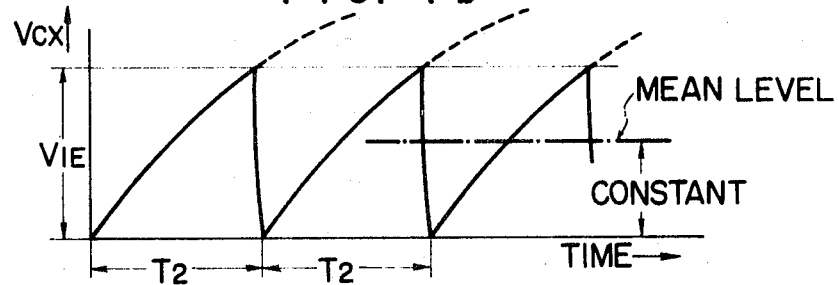

In FIG. 4a and 4b, there are shown the waveforms of the voltage generated at the point $P_1$ of contact between the photosensitive element $Rx$ and the capacitor $Cx$ with respect to time. When the object to be photographed is bright, the photosensitive element $Rx$ will have a small resistance value, and accordingly, the saw-tooth waves will have a short cycle $T_1$ as illustrated in FIG. 4a. However, when the object to be photographed is dark, and when the photosensitive element $Rx$ assumes a large resistance value accordingly, the saw-tooth waves will have a long cycle $T_2$ as shown in FIG. 4b. Now, by a careful observation of these two types of waveforms, it will be noted that these two waveforms have average wave heights which are equal to each other. The average wave height can be found by calculation. In general, the instantaneous voltage $Vcx$ is expressed as follows, with the time $t$ being a variable:

$$Vcx = E\left(1 - e^{-\frac{t}{CxRx}}\right), \quad 0 \leq t \leq T \tag{1}$$

Accordingly, the average value of wave height or the average voltage $Vcx$ of the waveform for one cycle can be obtained from:

$$\overline{Vcx} = \frac{1}{T}\int_0^T E\left(1 - e^{-\frac{t}{CxRx}}\right) dt \tag{2}$$

$$= \frac{1}{T}\left[Et + ECxRx\, e^{-\frac{t}{CxRx}}\right]_0^T$$

$$= \frac{1}{T}\left\{ET - ECxRx\left(1 - e^{-\frac{T}{CxRx}}\right)\right\} \tag{3}$$

wherein, in the instance $t = T$, it should be understood that $Vcx = V_{IE}$. Therefore, $V_{IE}$ will be expressed from the Equation (1), as follows:

$$V_{IE} = E\left(1 - e^{-\frac{T}{CxRx}}\right) \tag{4}$$

Accordingly, the Equation (4) may be substituted into the Equation (3) to reform the latter as follows:

$$\overline{Vcx} = E - V_{IE}\, Cx\, (Rx/I) \tag{5}$$

wherein the numerical value $Rx/T$ contained in the second term of the Equation (5) is of a constant value. Because, as will be understood from the Equation (1), if the photosensitive element $Rx$ takes a resistance value which is multiplied by $\alpha$, then the exposure time will increase by $\alpha$ times also. Therefore, even when the average value of the waveforms produced at such a point $P_1$ owing to the difference in the brightness of the object to be photographed is measured by the ammeter, it is presumed to be impossible to differentiate the difference in the waveform between these two. Accordingly, in order to indicate the exposure time based on the indication of the average value measured by the ammeter, there is required such waveforms that will cause variation of the average value of the waveforms in accordance with the exposure time or cycle.

Figure 5A:
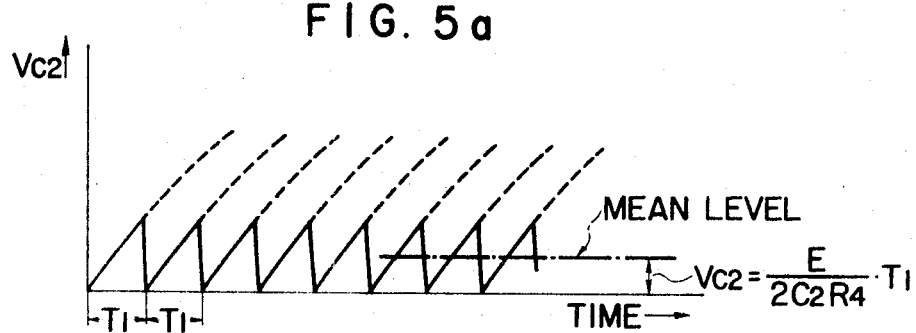
FIG. 5a and FIG. 5b are graphs showing the terminal voltage with respect to time of the capacitor in the waveform converter circuit shown in FIG. 3.
Figure 5B:
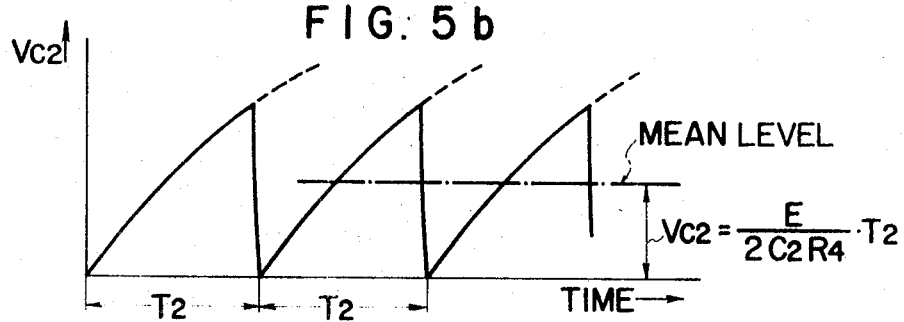

By referring now to FIG. 3 again, it will be noted that there is employed, as the means of converting the waveforms, another type of delay circuit comprising a resistor $R_4$ and a capacitor $C_2$. The transistor $Tr_6$ is connected in parallel with the capacitor $C_2$. The base electrode of this transistor is connected, via a resistor $R_5$, to one terminal $P_2$ of a resistor $R_2$. As a result, the transistor $Tr_6$ is brought into the "on" state in synchronism and at the same moment with the transistor $Tr_5$. Accordingly, the charge of the capacitor $C_2$, which has until then been accumulated therein, is discharged therefrom. The maximum value of the instantaneous voltage $Vc_2$ across the capacitor $C_2$ is such that, when the object to be photographed is bright, it assumes a small value because the charging time is short, whereas in case the object to be photographed is dark, it assumes a large value because of the prolonged charging time. In FIG. 5a and FIG. 5b, there are illustrated the voltage waveforms generated at the point $P_3$ of contact between a resistor $R_4$ and the capacitor $C_2$, in such a way that these waveforms correspond to the two different brightnesses of the scene. It should be noted that the converted two consecutive pulse voltages having different frequencies and values of wave height are respectively saw-tooth voltages having frequencies corresponding to the degree of brightness of the object to be photographed. Assuming now that the resistor $R_6$ which is connected in parallel with the capacitor $C_2$ takes a very large value, the instantaneous voltage $Vc_2$ of the capacitor $C_2$ for the period of one cycle may be expressed by:

$$Vc_2 = E\left(1 - e^{-\frac{t}{C_2R_4}}\right), \quad 0 \leq t \leq T \quad (6)$$

Assuming that the ratio between the output current and the input voltage in a field effect transistor $Tr_7$ is to be expressed by a coefficient $Gm$, the instantaneous drain current $id$ may be expressed as follows by utilizing the Equation (6):

$$id = GmE\left(1 - e^{-\frac{t}{C_2R_4}}\right), \quad 0 \leq t \leq T \quad (7)$$

If the transistor $Tr_7$ is preliminarily rendered to the "cutoff" state by means of a potentiometer $R_7$, the instantaneous current $id$ which is expressed by the Equation (7) flows through the ammeter $A_1$ which is connected to the collector circuit of the transistor $Tr_7$. At this moment, the ammeter $A_1$ indicates the average value of the current $id$. The average value of $Id$ of the current $id$ may be calculated according to the following equation:

$$Id = \frac{GmE}{T}\int_0^T \left(1 - e^{-\frac{t}{C_2R_4}}\right)dt \quad (8)$$

$$= \frac{GmE}{T}\left(T - C_2R_4 + C_2R_4 e^{-\frac{T}{C_2R_4}}\right) \quad (9)$$

$$= \frac{GmE}{T}\left\{T - C_2R_4 + C_2R_4\left(1 - \frac{T}{C_2R_4} + \frac{1}{2}\frac{T^2}{C_2^2R_4^2} + \cdots\right)\right\} \quad (10)$$

The transfer from Equation (9) to Equation (10) utilizes a Maclaurin's series. When $T/C_2R_4$ takes a relatively small value, the Equation (10) may be simplified, and it will be expressed by:

$$Id = (GmE/T) \cdot (T^2/2C_2R_4) = (GmE/2C_2R_4) \cdot T \quad (11)$$

For this reason, the indication by the ammeter $A_1$ is substantially in proportion with the exposure time $T$. The average current $Id$ shown in Equation (11) constitutes the direct function of the exposure time $T$, and therefore, the exposure factors such as the sensitivity of the film and the diameter of the diaphragm are established not only by the diaphragm mechanism (not shown) which is adapted to alter the light-receiving area, but also by altering the emitter bias of the transistor $Tr_1$ by virtue of the potentiometer $R_1$. Although not shown, if a resistor is connected to either the collector circuits or the emitter circuits of the transistors $Tr_5$ and $Tr_6$, this resistor will make it possible to limit the collector current flowing through these transistors $Tr_5$ and $Tr_6$ to a level lower than the maximum allowable collector current of these transistors $Tr_5$ and $Tr_6$. The sensitivity of the ammeter $A_1$ is regulated by a variable resistor $R_8$. In FIG. 3, the average value of the voltage which is generated at the point $P_3$ is determined. However, description will be made by referring to FIG. 6 on the circuit for determining the maximum value of this voltage.

Figure 6:
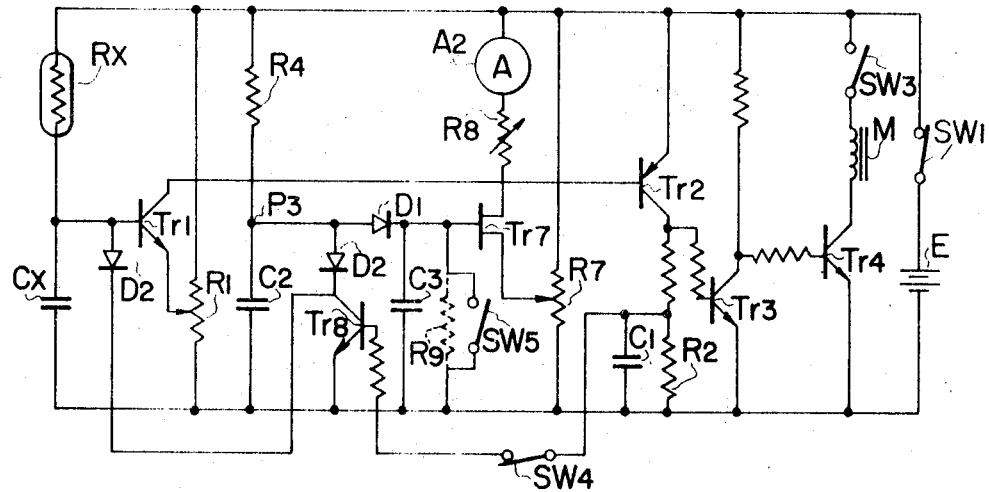
FIG. 6 is a diagram of an electronic circuit showing a modification of the embodiment shown in FIG. 3.

In FIG. 6, the voltage in saw-tooth waveform which appears at the point $P_3$ of contact between the resistor $R_4$ and the capacitor $C_2$ is rectified as it is applied through a diode $D_1$, and the voltage indicating the value of its wave height is retained by a capacitor $C_3$. The voltage waveforms which appear at the point $P_3$ in accordance with the levels of the brightness of the object to be photographed are identical with those shown in FIG. 5a and FIG. 5b. The maximum value $Vc_{2max}$ of the voltage appearing at the point $P_3$ or the voltage applied to the gate electrode may be expressed as follows, with the exposure time $T$ being a variable:

$$Vc_{2max} = E\left(1 - e^{-\frac{T}{C_2R_4}}\right) \quad (12)$$

For this reason, the current $Id$ which flows through the ammeter $A_2$ connected to the drain of the field effect transistor $Tr_7$ is expressed, by utilizing the aforesaid numerical value $Gm$, as follows:

$$Id = \frac{GmE}{T}\int_0^T \left(1 - e^{-\frac{t}{C_2R_4}}\right) \quad (13)$$

wherein the exponential function $e^{-T/C_2R_4}$ may be expanded in accordance with Maclaurin's series. Therefore, if $T/C_2R_4$ takes a small value, the Equation (13) may be expressed in a simplified form as follows:

$$Id = (GmE/C_2R_4) \cdot T \quad (14)$$

wherein $GmE/C_2R_4$ is a certain constant, and therefore, the Equation (14) means that the current which flows through the ammeter $A_2$ is in direct proportion with the exposure time $T$. The circuit arrangement shown in FIG. 6 may be noted to be somewhat different from the arrangement shown in FIG. 3. In FIG. 6, a transistor $Tr_8$ is utilized to discharge both the capacitor $Cx$ and the capacitor $C_2$. This means that the actions of the transistors $Tr_5$ and $Tr_6$ in FIG. 3 can be performed by a single transistor $Tr_8$. The diodes $D_2$ and $D_3$ are used for insulating the current for charging the capacitor $Cx$ from the current for charging the capacitor $C_2$. Also, the switch $SW_5$ is used to discharge the charge accumulated in the capacitor $C_3$ after the completion of the measurement of the exposure time. If, however, a resistor $R_9$ (indicated by dotted lines) which has a high resistance value is connected in parallel with the capacitor $C_2$, the switch $SW_5$ may be omitted. In FIG. 6, if the transistor $Tr_7$ is used in the form of an appropriately biased source follower connection, and if the source voltage is measured by a voltmeter, the pointer of the voltmeter will directly indicate the value of the voltage appearing at the point $P_3$.

Figure 7:
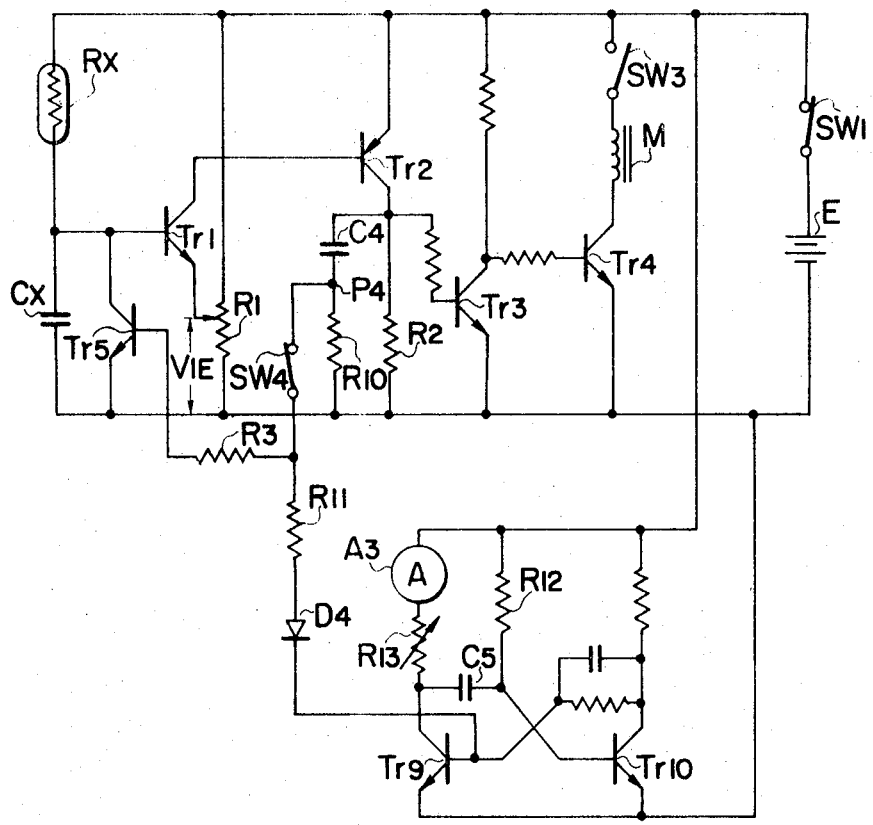
FIG. 7 is a diagrammatic representation of an electronic circuit showing another embodiment of the invention.
Figure 8A:
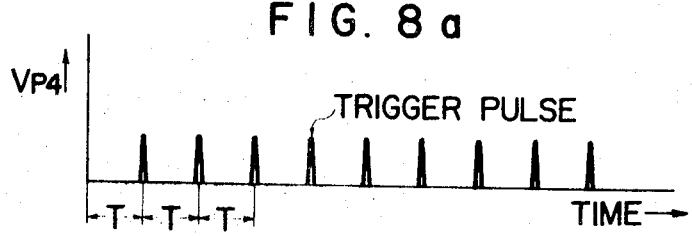
FIGS. 8a, 8b, 8c and 8d are graphs showing the trigger waveform and the output waveform in a monostable multivibrator shown in FIG. 7 for two different brightnesses of the scene in relation with time.
Figure 8B:
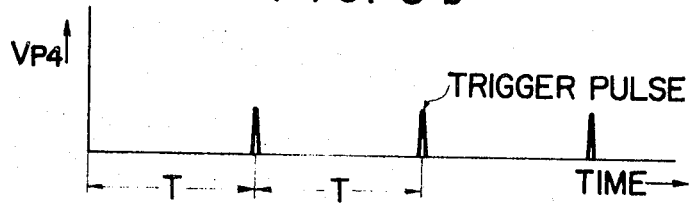
Figure 8C:
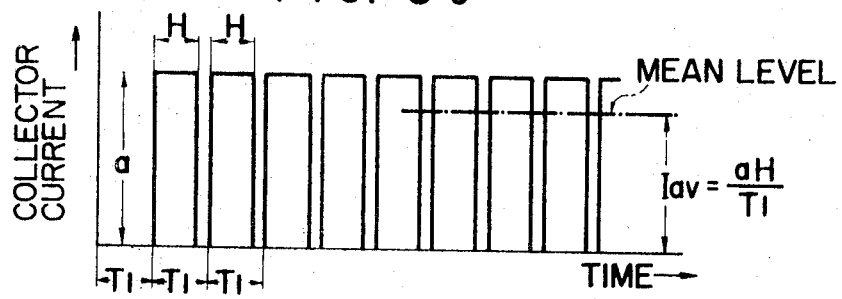
Figure 8D:
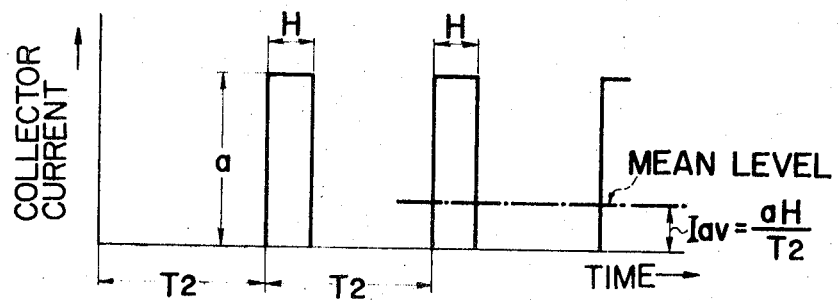

In FIG. 7, there is shown a waveform converter circuit utilizing a monostable multivibrator circuit. A series circuit of a capacitor $C_4$ and a resistor $R_{10}$ are connected in parallel with the collector resistor $R_2$ of the transistor $Tr_2$. The instantaneous pulse voltage $V_{p4}$ which appears at the point $P_4$ of contact between the capacitor $C_4$ and the resistor $R_{10}$ is fed back, through the resistor $R_3$, to the base electrode of the transistor $Tr_5$. At the same time, the voltage $V_{p4}$ is applied, via a resistor $R_{11}$ and the diode $D_4$, to the base of the transistor $Tr_9$ which is one of the transistors constituting the monostable multivibrator circuit. The monostable multivibrator is arranged so as to function that, in its steady state, the transistor $Tr_{10}$ is placed in the "on" state and that the transistor $Tr_9$, in turn, is placed in the "cutoff" state. Therefore, each time a positive trigger pulse is applied to the base electrode of the transistor $Tr_9$, this transistor $Tr_9$ will remain in this "on" state for a certain length of time H independently of the cycle of the aforesaid trigger pulse. This time H is expressed by:

$$H = kC_5R_{12} \qquad (15)$$

wherein, $k$ is a constant. The waveforms of the pulse voltage which appears at the point $P_4$ are shown in two patterns, i.e., for the object to be photographed which is relatively bright and for the object which is dark, in FIG. 8a and FIG. 8b, respectively. In FIG. 8c is shown the waveform of the collector current of the transistor $Tr_9$ which flows through the ammeter $A_3$ when the pulse voltage shown in FIG. 8a is applied to the base of the transistor $Tr_9$ as the trigger pulse. In a similar way, the waveform which flows through the ammeter $A_3$ by virtue of the trigger voltage shown in FIG. 8b is illustrated in FIG. 8d. Since the ammeter $A_3$ indicates an average value of the collector current of the transistor $Tr_9$, the average value $I_{av}$ is expressed, with the exposure time $T$ being a variable, as follows:

$$I_{av} = aH/T \qquad (16)$$

wherein $a$ represents the value of wave height. Where the internal resistance of the ammeter $A_3$ may be ignored, the value of $a$ is substantially equal to $E/R_{13}$. The Equation (16) means that the indication by the ammeter $A_3$ is in reverse proportion with the exposure time. The breadth of the pulse obtained from the Equation (15) may be selected so as to have a value slightly smaller than the minimum exposure time which is, for example, 1/500 second, which is a value required to be measured ordinarily. Also, in case the ammeter is connected to the collector circuit of the transistor $Tr_{10}$ to measure the collector current thereof, the average current $I'_{av}$ which flows through this ammeter may be expressed by:

$$I'_{av} = a(1 - H/T) \qquad (17)$$

Figure 9:
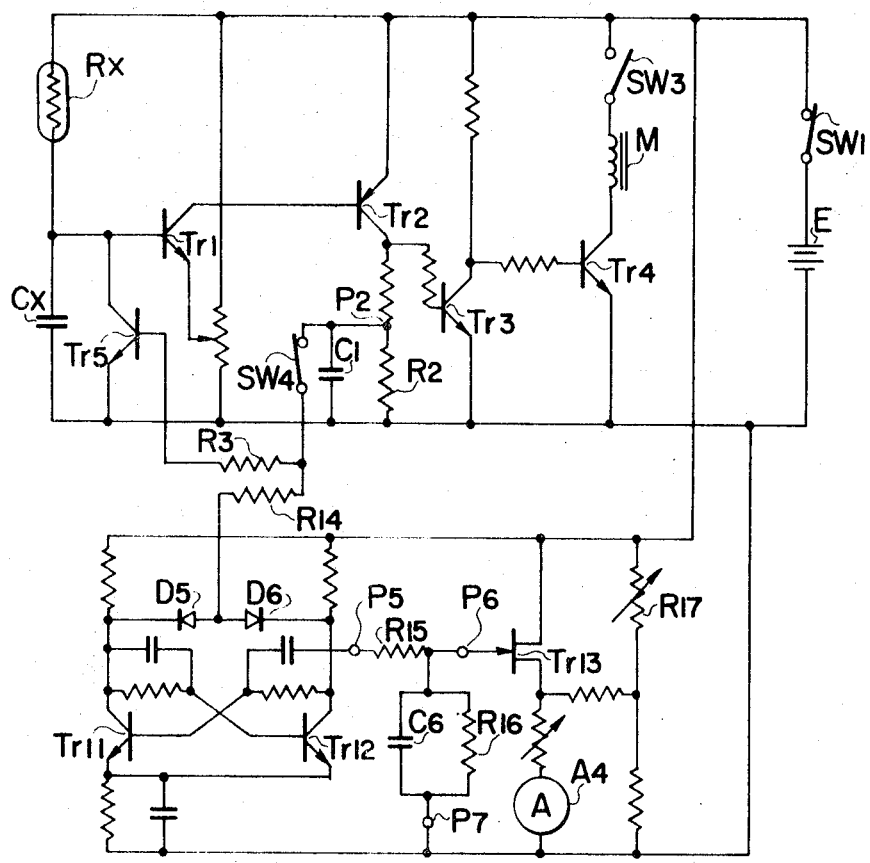
FIG. 9 is an electronic circuit showing a still another embodiment of the invention.
Figure 10A:
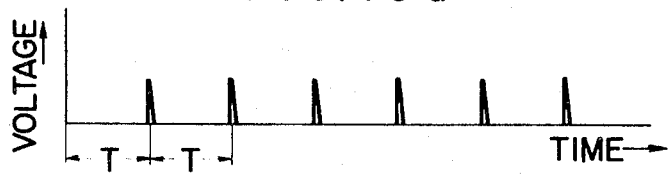
FIGS. 10a and 10b are graphs showing the trigger waveform and the output waveform in a bistable multivibrator shown in FIG. 9.
Figure 10B:
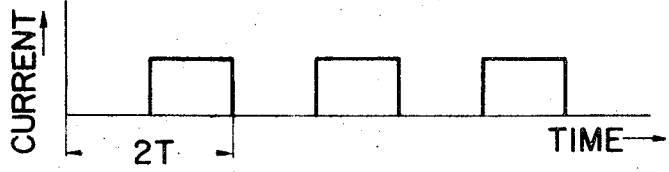
Figure 11A:
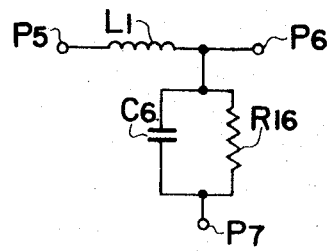
FIG. 11a and FIG. 11b are other examples of the branch circuit of the frequency discriminator shown in FIG. 9.
Figure 11B:
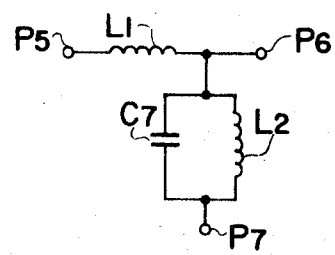

In FIG. 9, there is shown a waveform converter circuit utilizing a bistable multivibrator. The output of this circuit is led to the frequency discriminator circuit whose output is adapted to vary with the frequency. In FIG. 9, the consecutive pulse voltage $V_{p2}$ which appears at one terminal $P_2$ of the collector resistor $R_2$ of the transistor $Tr_2$ is fed back via the resistor $R_3$ to the base electrode of the transistor $Tr_5$. At the same time, this voltage $V_{p2}$ is applied as a trigger pulse voltage, via the resistor $R_{14}$ and the diodes $D_5$ and $D_6$, to the respective collectors of the transistors $Tr_{11}$ and $Tr_{12}$ which constitute the bistable multivibrator. As is well known in the field of electric circuits, the transistors $Tr_{11}$ and $Tr_{12}$ retain the same state of action for the period from the arrival of one trigger pulse till the arrival of the following trigger pulse. It is for this reason that the rectangular pulse voltage which appears in the collector of the transistor $Tr_{12}$ is of a frequency which is one-half of that of the trigger pulse (refer to FIG. 10). A branch circuit consisting of a series circuit containing a resistor $R_{15}$ and a resistor $R_{16}$ and a capacitor $C_6$ connected in parallel with this resistor $R_{16}$ is connected between the output terminals $P_5$, $P_7$ of the transistor $Tr_{12}$ and the input terminal $P_6$ of the transistor $Tr_{13}$. By virtue of the rectangular consecutive pulse signals which are generated in the collector of the transistor $Tr_{12}$, the voltage which appears at the point $P_6$ of contact between the resistor $R_{15}$ and the resistor $R_{16}$ will vary in accordance with the frequency of the pulse signal or with the exposure time. In this case, the resistor $R_{15}$ forms a low pass filter for a branch circuit consisting of the capacitor $C_6$ and the resistor $R_{16}$. Therefore, by measuring this voltage, it will become possible to indicate the exposure time. In this example, a field effect transistor $Tr_{13}$ is used in the form of source follower connection, and the base electrode thereof is connected to the contact point $P_6$. A variable resistor $R_{17}$ is employed to regulate the bias point of the transistor $Tr_{13}$. Also, an ammeter $A_4$ is used to measure the source voltage. At this moment, the pointer of the ammeter $A_4$ will indicate a value of voltage equal to the voltage at the point $P_6$. It should be noted, however, that by the use of a different indicator circuit arrangement (or measurement circuit arrangement) containing an indicator, it is also possible to indicate the exposure time corresponding to the voltage at the point $P_6$. In FIGS. 11a and 11b, there are shown branch circuits of a frequency discriminator of another type utilizing inductive elements. In FIG. 11a, a coil $L_1$ is connected in series with a capacitor $C_6$ and a resistor $R_{16}$. In FIG. 11b, a coil $L_1$ is connected in series with a tank circuit containing a coil $L_2$. The voltage which depends on the frequency and which appears at the points $P_6$ shown in FIGS. 11a and 11b takes a value greater than that of the voltage which appears at the point $P_6$ of contact bearing the same reference numeral in FIG. 9. The coil $L_1$ shown in FIG. 11b may be replaced by a resistor. Consequently, the coil L, and the resistor $R_{15}$ represent low pass filters; the capacitor $C_6$ with resistor $R_{16}$, and the capacitor $C_7$ with coil $L_2$ represent high pass filters.

All of the oscillation circuits which have been described heretofore in this specification are arranged so as to discharge the charge accumulated in the capacitor $Cx$ by the use of a transistor discharge circuit provided exclusively for this purpose. There is, however, shown in FIG. 12 an electronic shutter circuit arrangement having an oscillation circuit utilizing a unijunction transistor.

Figure 12:
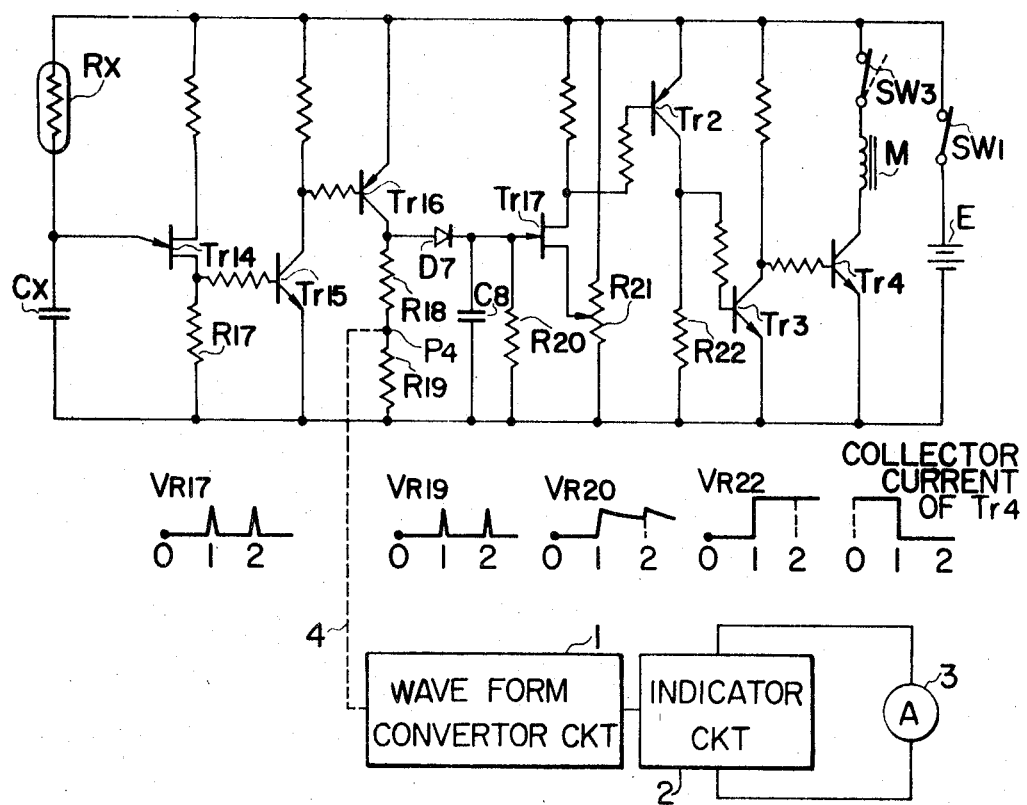
FIG. 12 is an example of the electronic shutter circuit embodying the present invention.

In the circuit shown in FIG. 12, there is illustrated an instance in which the circuit in actual form illustrated in the upper part of this drawing functions as the electronic shutter device. Assuming now that the power source switch $SW_1$ is closed, the capacitor $Cx$ is charged through the photosensitive element $Rx$, which is exposed to the light coming from the object to be photographed. When the terminal voltage of the capacitor $Cx$ exceeds the peak point emitter voltage of the unijunction transistor $Tr_{14}$, this latter is instantaneously rendered to the "on" state for a unit length of time. This results in the lowering of the terminal voltage of the capacitor $Cx$, rendering the transistor $Tr_{14}$ to the "cutoff" state. This makes it possible for the capacitor $Cx$ to resume the charging thereof. Such an action of the circuit will take place in consecutive cycles, and therefore, there will appear, as is well known, consecutive pulse voltages in the terminal of the resistor $R_{17}$ which is connected to the first base. This pulse voltage is amplified by the transistors $Tr_{15}$ and $Tr_{16}$, and the resulting amplified voltage appears at the terminal of contact of the resistors $R_{18}$ and $R_{19}$ of the collector of the transistor $Tr_{16}$. This pulse voltage is rectified by a diode $D_7$, and is retained in the smoothed state by virtue of a capacitor $C_8$ and a resistor $R_{20}$. If the source bias of the field effect transistor $Tr_{17}$ is properly selected by a potentiometer $R_{21}$, the initial temporary charge of the transistor $Tr_{16}$ makes it possible for the transistor $Tr_{17}$ to be rendered to the "on" state permanently. The "on" state of the transistor $Tr_{17}$ causes the transistors $Tr_2$ and $Tr_3$ to be brought into the "on" state, and on the other hand, it causes the transistor $Tr_4$ to be brought into the "cutoff" state from the "on" state. Accordingly, the electromagnet M is deprived of the energy to attract thereto the shutter blades (not shown) in their open state, and thus, the shutter blades are closed. The waveforms of voltage in the respective parts of the circuit shown in FIG. 12 are illustrated, as models, in the lower part of the drawing.

In the circuit shown in FIG. 12, in case this circuit is utilized to indicate the exposure time, the switch $SW_3$ is opened as shown in dotted lines in order to save the power to be used. As described already, there are generated consecutive pulse voltages, such as those shown in FIG. 8a and FIG. 8b, at the connection terminals of the resistors $R_{17}$ and $R_{19}$, respectively. If these pulse voltages are applied to the waveform converter circuit, it will become possible to indicate the exposure time from the resulting voltage from the waveform converter. By referring to the descriptions made with respect to the circuits shown in FIGS. 3, 6, 7 and 9, it should be understood easily from the previous statement that the circuit shown in FIG. 12 can be utilized to indicate the exposure time. The blocks labeled 1 and 2 shown in the lower part of the drawing represent the waveform converter circuit and the indicator circuit (or it may be termed a measuring circuit), respectively. It may be noted that the block labeled 2 contains an indicator 3. The lead 4 indicated in dotted lines and connecting the contact point $P_4$ with the waveform converter circuit 1 is provided to suggest the connection in case the exposure time is to be indicated. It should be noted also that the voltage which is applied between the first and the second bases of the unijunction transistor $Tr_{14}$ may be variable in order to control the peak point emitter voltage. It will be noted that this variable voltage serves to expand the conditions for establishing the exposure factors as stated before.

When unexpected vibration of the pointer of either the aforesaid ammeter or the aforesaid voltmeter must be avoided, there may be additionally provided a vibration preventive means for the ammeter or the voltmeter. Needless to say, there may be provided also, if required, additional amplifiers (which have not been described above) for the circuit in order to amplify the signals generated in the respective parts of the circuit.

The present invention has been described with respect to particular embodiments. It should be understood, however, that various other circuit arrangements may be made without departing from the spirit and the scope of the invention by those skilled in the art.

I claim:

1. A photographic camera equipped with an electronic shutter device comprising a first delay circuit comprising a photosensitive element and a first capacitor, an amplitude selection circuit connected to said first delay circuit and capable of converting from a cut-off state to a conductive state when the terminal voltage of said first capacitor has reached a predetermined value, a transistorized switching circuit connected to said amplitude selection circuit and containing this latter circuit, an electromagnet connected to the collector electrode of the output transistor of said transistorized switching circuit being capable of controlling the shutter blades, said photographic camera further comprising a device for preliminarily indicating exposure time, the latter device comprising:

an oscillation circuit comprising said first delay circuit, said transistorized switching circuit, a first discharge circuit connected in parallel with said first capacitor and a feedback circuit connected from said transistorized switching circuit to said first discharge circuit, a waveform converter circuit connected to said oscillation circuit and capable of forming different consecutive signals based on the signals generated from said oscillation circuit, and an indicator circuit containing an indicator and being connected to said waveform converter circuit and being capable of measuring said consecutive signals generated from said waveform converter circuit.

2. A photographic camera according to claim 1, in which said waveform converter circuit comprises:

a second delay circuit comprising a fixed resistor and a second capacitor, a second discharge circuit connected in parallel with said second capacitor, and a trigger circuit connected from said oscillation circuit to said second discharge circuit.

3. A photographic camera according to claim 2, in which said first discharge circuit comprises a series circuit formed with a first diode and a transistor Tr8, and said second discharge circuit comprises a series circuit formed with a second diode and said same transistor Tr8.

4. A photographic camera according to claim 1, in which said waveform converter circuit consists of a bistable multivibrator, and said measuring device comprises an indicator circuit containing a frequency discriminator connected to the output terminal of said bistable multivibrator.

5. A photographic camera according to claim 4, in which said frequency discriminator comprises a series circuit formed with a low pass filter means and a high pass filter means.

6. A photographic camera according to claim 4, in which said frequency discriminator comprises a series circuit formed with a first resistor and a second resistor, and a capacitor connected in parallel with said second resistor.

7. A photographic camera according to claim 1, in which said waveform converter circuit consists of a monostable multivibrator.

8. A photographic camera according to claim 7, in which said camera has an indicator connected to the collector circuit of one of the transistors constituting said monostable multivibrator.

9. A photographic camera equipped with an electronic shutter device comprising:

a first delay circuit comprising a photosensitive element and a first capacitor, an oscillator circuit serving concurrently as an amplitude selection circuit containing a unijunction transistor having an emitter electrode connected to the point of connection between said photosensitive element and said first capacitor and a first and a second base electrodes, a voltage retaining circuit connected to said oscillation circuit, a transistorized switching circuit connected to said voltage retaining circuit and capable of performing switching action upon the appearance of a voltage in said voltage retaining circuit, and an electromagnet connected to the collector electrode of the output transistor of said transistorized switching circuit and capable of controlling the shutter blades.

10. A photographic camera equipped with an electronic shutter device according to claim 9, in which said camera is provided with a device for indicating the exposure time, said latter device comprising:

a waveform converter circuit connected to said oscillation circuit and capable of forming different consecutive signals based on the signals generated from said oscillation circuit, and an indicator circuit connected to said waveform converter circuit and containing an indicator for measuring said consecutive signals generated from said waveform converter circuit.

11. A photographic camera according to claim 10, in which said waveform converter circuit comprises:

a second delay circuit comprising a fixed resistor and a second capacitor, a second discharge circuit connected to said second capacitor, and a trigger circuit connected from said oscillation circuit and said second discharge circuit.

12. A photographic camera according to claim 10, in which said waveform converter circuit consists of a monostable multivibrator.

13. A photographic camera according to claim 12, in which said camera has an indicator connected to the collector circuit of one of the transistors constituting said monostable multivibrator.

14. A photographic camera according to claim 10, in which said waveform converter circuit comprises a bistable multivibrator, and said measuring device comprises an indicator circuit containing a frequency discriminator connected to the output terminal of said bistable multivibrator.

15. A photographic camera according to claim 14, in which said frequency discriminator comprises a series circuit formed with a low pass filter means and a high pass filter means.

16. A photographic camera according to claim 14, in which said frequency discriminator comprises a series circuit formed with a first resistor and a second resistor, and a capacitor connected in parallel with said second resistor.

17. In a camera system having a photocell for receiving incident light of a variable intensity and for providing information therefrom for indicating the proper exposure settings on the camera, the improvement comprising:

A. signal generating means for generating an electrical signal having a frequency controlled by the intensity of said light received by said photocell,
B. an indicator, and
C. means for receiving said electrical signal and for converting said electrical signal to provide said indicator with an electrical waveform having an average value dependent upon said frequency, whereby said indicator provides an indication of proper exposure settings corresponding to the intensity of the incident light.

* * * * *